United States Patent
Bakshi et al.

(10) Patent No.: US 11,574,304 B2
(45) Date of Patent: Feb. 7, 2023

(54) BLOCKCHAIN-BASED DYNAMIC PAYTERM GENERATOR

(71) Applicant: Bank of America Corporation, Charlotte, NC (US)

(72) Inventors: Sakshi Bakshi, New Delhi (IN); Siva Kumar Paini, Telangana (IN); Amod Jha, Telangana (IN); Amit Kumar Sati, Uttarakhand (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/315,416

(22) Filed: May 10, 2021

(65) Prior Publication Data
US 2022/0358495 A1 Nov. 10, 2022

(51) Int. Cl.
| | | |
|---|---|---|
| *G06Q 20/38* | (2012.01) | |
| *G06N 20/00* | (2019.01) | |
| *H04L 9/06* | (2006.01) | |
| *G06Q 30/02* | (2012.01) | |
| *H04L 9/00* | (2022.01) | |

(52) U.S. Cl.
CPC ......... *G06Q 20/3825* (2013.01); *G06N 20/00* (2019.01); *G06Q 30/0201* (2013.01); *H04L 9/0618* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 11,373,173 | B2 * | 6/2022 | Himura | G06F 16/1824 |
| 2015/0006393 | A1 * | 1/2015 | Allin | G06Q 30/04 |
| | | | | 705/44 |
| 2016/0203468 | A1 * | 7/2016 | Chen | G06Q 20/3274 |
| | | | | 705/75 |
| 2018/0268151 | A1 * | 9/2018 | Cuomo | H04L 9/3297 |
| 2019/0236598 | A1 * | 8/2019 | Padmanabhan | G06Q 20/0655 |
| 2020/0226518 | A1 * | 7/2020 | Li | G06Q 10/063118 |
| 2020/0344132 | A1 * | 10/2020 | Padmanabhan | H04L 41/22 |
| 2021/0042737 | A1 * | 2/2021 | Starr | G06Q 20/405 |
| 2021/0049699 | A1 * | 2/2021 | Chiu | G06N 20/00 |
| 2021/0326815 | A1 * | 10/2021 | Brody | G06Q 20/382 |
| 2022/0358495 | A1 * | 11/2022 | Bakshi | G06Q 20/3825 |

OTHER PUBLICATIONS

"Yu-Jen Chen, Ja-Ling Wu, Yung-Chen Hsieh and Chih-Wen Hsueh, An Oracle-Based on-chain Privacy, MDPI, 6-9" (Year: 2020).*

* cited by examiner

*Primary Examiner* — Kito R Robinson
*Assistant Examiner* — Toan Duc Bui
(74) *Attorney, Agent, or Firm* — Weiss & Arons LLP (57) ABSTRACT

Systems, methods, and apparatus are provided for a dynamic contract payment term ("payterm") generator. A machine learning algorithm may generate a replacement payment term for a contract based on market-based parameters and blockchain metadata for the contract. The blockchain metadata may encode hierarchical interdependencies between contracts using blockchain encryption. The blockchain metadata may be applied to auto-generate machine learning inputs for related contracts having interdependent payment terms. The machine learning inputs may include contract parameters that have been extracted and encrypted as blockchain metadata, as well as market-based parameters extracted from enterprise sources.

21 Claims, 5 Drawing Sheets

BLOCKCHAIN-BASED DYNAMIC PAYTERM GENERATOR

FIELD OF TECHNOLOGY

Aspects of the disclosure relate to leveraging blockchain-based contract encryption for smart generation of contract payment terms.

BACKGROUND OF THE DISCLOSURE

Enterprise contracts may involve a complex hierarchical web of obligations. Pieces may include supercontracts, subcontracts, and multiple statements of work (SOWs), as well as revised or updated versions of all of these documents. Each document may include payment terms that themselves present a number of options and contingencies. Moreover, employees who initially negotiate the payment terms of a document may move on, leaving no one aware of the interrelationships between the documents or the evolution of party obligations.

A complete awareness of all related contract terms is itself often insurmountable. An understanding of the content of these terms and the relative advantages of each payment option along with an assessment market factors is beyond the capabilities of current systems.

It would be desirable to provide a computer utility capable of autonomously using distributed ledger infrastructure to identify interrelated payment terms. It would further be desirable to combine the distributed ledger infrastructure with machine learning algorithms to determine a lowest cost payment schedule for the enterprise.

SUMMARY OF THE DISCLOSURE

Systems, methods, and apparatus for a blockchain-based dynamic payterm generator are provided.

A distributed ledger may store encrypted contract data in blockchain format.

A first script may extract contract parameters from a plurality of blockchain contracts in the distributed ledger and encrypt each set of parameters as a metadata block associated with the corresponding contract.

A second script may determine a hierarchical relationship between a first contract and one or more related contracts from the plurality of blockchain contracts and encrypt the hierarchy data as a metadata block associated with the first contract. The determination may be based, at least in part, on the extracted contract parameters.

A third script may determine a subset of the related contracts each having a payment term dependent on a payment term in the first contract and encrypt the dependent payment term data as a metadata block associated with the first contract. The determination may be based, at least in part, on the extracted contract parameters.

A fourth script may extract a set of market-based parameters from an enterprise portal.

Auto-generated inputs to a machine learning algorithm may include the extracted contract parameters for the first contract and for the related contracts having dependent payment terms. The inputs may include the market-based parameters. The machine learning algorithm may generate a new payment term for the first contract based at least in part on the inputs.

An auto-managed repository may be in communication with the machine learning algorithm. The repository may store evaluation logs and may be applied to train and tune the machine learning algorithm.

A user interface may display the hierarchical relationship between the first contract and the related contracts. The display may include a visual indicator marking the subset of the related contracts each having a payment term dependent on a payment term in the first contract.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Systems, methods and apparatus for a dynamic blockchain-based smart payterm generator are provided.

Enterprise contracts may involve a complex hierarchical web of obligations. Pieces may include supercontracts, subcontracts, and multiple statements of work (SOWs), as well as revised or updated versions of all of these documents.

Each of these related documents may include payment terms that involve multiple options or contingencies. For example, each payment term (alternately known as "payterms") may include one or more early payment dates, with different discount amounts applied for each date.

Processes that require comprehensive awareness the interdependencies within this hierarchy of contracts present a number of technical challenges. A first problem involves capturing the relationships between these disparate contract documents. The contracts may be generated at different times, by different enterprise divisions without any awareness of each other, and may not be obviously related. Some of the contract documents may be digitized, while others may be physical contracts.

A blockchain is a distributed ledger of records which contain information. Records stored in a blockchain are organized in blocks. Each block may include multiple records. The blocks are linked to one another and secured using cryptography.

Blockchain storage may capture the hierarchy of interrelated contracts. For example, as set forth above, some contracts may have multiple subcontracts. Individual subcontracts in this array may have a particular SOW or payment clause associated with them. The reality of these relationships can be captured through blocks of contract metadata. Blockchain encryption may involve hashing the metadata for an individual contract block and for all of the contracts in a related superset. Any changes to contract metadata may cause the system to flag the related contracts.

A second challenge involves the dependencies between the various payment terms and their multiple payment schedule options. Because the contracts are interrelated, a payment on one contract may affect the payment options for the other related contracts. Market factors such as interest rates may also affect the timing for a contract payment. Although many payment terms include a discount for early payment, this may not always be the most cost-effective option.

AI-based processing may leverage the blockchain system to auto-generate inputs from the blockchain contracts. The inputs may be based on the contract interdependencies encoded in the blockchain. AI-based processing may also incorporate inputs capturing market factors. One or more machine learning algorithms may process the inputs and output a new contract payment term that incorporates awareness of the entire field.

For the sake of illustration, the invention will be described as being performed by a "system." The system may include one or more features of apparatus and methods that are described herein and/or any other suitable device or approach.

The system may include blockchain-based contract storage. For a digital contract, the system may determine whether a blockchain entry for the contract exists. If no blockchain entry for the contract exists, the system may generate an entry. For a physical contract, the system may scan and digitize the contract using optical character recognition (OCR) capabilities. A blockchain entry may be created for the newly digitized physical contract.

Once the blockchain contract storage is established, the system may extract contract parameters. The system may use Python™ scripts or any suitable program in any suitable language to extract contract parameters. Python is a registered trademark of the Python Software Foundation. Python is an interpreted, object-oriented, high-level general-purpose programming language.

A contract reader may scan the blockchain contracts to filter out the relevant contract parameters. An information extractor may incorporate the scanned data into a set of contract parameters.

The system may extract any suitable contract parameters. The contract parameters may be predetermined by the system or by a system user. In some embodiments, specific parameters may be selected on a case-by-case basis via a user interface. Illustrative contract parameters may include a payment term for the contract, an amount of a payment, a discount term for the contract, an amount of a discount, vendor information, a latest payment date, a previous payment term for similar products or services, and a total spend on products or services.

The extracted contract parameters may be stored as a metadata block in association with the blockchain contract.

The information extractor may determine whether payment is required for the entire contract or whether there is a schedule of partial payments. The information extractor may determine whether payments will be made for subcontracts, SOWs or discrete sections of the contract. The determination may be based on the extracted contract parameters.

For physical contracts, manual inputs may capture contract parameters. The contract parameters for manual input may be the same as the contract parameters extracted by the system. The contract parameters for manual input may be different from the contract parameters extracted by the system. An input profiler may check the inputs for standardized data formats. The input profiler may convert the inputs to a unified format for storage on the blockchain.

A contract analyzer may analyze the extracted contract parameters and identify relationships between contracts. Relationships between contracts may be determined based on common clauses, common parties, common products, common payment dates or any other suitable information shared between the two contracts. Relationships between contracts may be determined based on extracted contract parameters or manually input contract parameters.

The relationships may include a hierarchical arrangement involving a contract and one or more subcontracts or SOWs. The system may generate contract metadata blocks associated with the contract interrelationships. The contract analyzer may arrange the metadata blocks according to the contract hierarchy using the blockchain hashing. For a physical contract, the contract analyzer may generate the contract metadata based on the standardized manual inputs.

A contract separator may separate contracts within the hierarchy that have interdependent payment terms. The contract separator may be aligned with the blockchain. The contract separator may trace the hierarchy to identify any blocks that would be affected by a payment on a related contract. For each contract, the system may generate a metadata block that includes information associated with any payment term interdependencies.

The system may include a user interface. The user interface may be configured to display the hierarchical relationships between contracts. The display may include a vertical and/or horizontal arrangement that incorporates graphical representations of the contracts and subcontracts. The display may show the contracts and subcontracts on different tiers of the hierarchy. The display may use lines, arrows or any suitable connectors to show relationships between the contracts. The display may mark contracts within the hierarchy that have interdependent payment terms using a visual indicator. The display may use highlighting, color-coding, typeface changes, borders, text, or any suitable means to mark the contracts having interdependent payment terms.

The system may include one or more machine learning algorithms. The system may perform feature engineering on the metadata from the blockchain including the extracted contract parameters, the manually input contract parameters, the hierarchy metadata generated by the contract analyzer, and the metadata generated by the contract separator. Feature engineering may prepare the input data for machine learning by creating features from the raw data. The system may use domain knowledge of contracts to determine relevance and importance of dataset features that the machine learning model will need to determine a target output. In some embodiments, new features may also be created from existing features using feature crossing. The system may use hyper-parameter tuning to pre-process the contract parameters. The system may use exploratory data analysis or any other data science protocols to prepare the blockchain-based inputs and the manual inputs for machine learning.

Additional inputs to the machine learning algorithm may capture market factors such as interest rates, currency valuation, or local compliance norms. Python scripts or any suitable program in any suitable programming language may be used to extract market data from an enterprise source. The source may include internal data from an enterprise portal. An input profiler may standardize the extracted data to generate unified inputs. An input validator may perform data quality checks using any suitable data quality metric.

Additional inputs to the machine learning algorithm may include payment history data. The system may determine whether payments were made for any related contract. Payment history for any of the contracts may be stored in an auto-managed repository.

The machine learning algorithm may analyze contract parameters for a given contract and for contracts having interdependent payment terms. The relevant inputs may be identified via the blockchain metadata for the given contract.

The machine learning algorithm may analyze the inputs and determine the outcomes of various combinations of contract payment options. The machine learning algorithm may determine the effect of making a payment on the other related contracts. The system may include regression, classification, cluster analysis or any suitable machine learning algorithms. In some embodiments, the machine learning model may incorporate multiple machine learning algorithms. The multiple algorithms may be applied selectively or may be applied in sequence.

The system may output an optimized payment term for a contract. The new payment term may be based on an evaluation of all possible payment options for all related contracts, as well as payment history data and market status data.

Before the inputs are submitted to the machine learning algorithm, the system may determine whether there is system history involving the same contract parameters. Evaluation logs for the machine learning model may be stored in an auto-managed repository. The system may access the auto-managed repository to determine whether the same scenario has been previously evaluated. If a scenario has already been analyzed, the system may bypass the machine learning evaluation, increasing output efficiency and reducing the data footprint.

The efficiency and accuracy of the machine learning model may improve over time. Inputs to the machine learning algorithm from the blockchain and from market trends, including the associated evaluation logs, may be maintained in the auto-managed repository. Data in the auto-managed repository may be applied to train the machine learning model. As set forth above, repository data may also be used to provide direct evaluation for similar inputs, increasing efficiency and reducing the data footprint for the system. Additionally, information regarding paid and unpaid contracts may be flagged and stored in the repository for future reference.

One or more non-transitory computer-readable media storing computer-executable instructions are provided. When executed by a processor on a computer system, the instructions perform a method for autonomous capture of hierarchical relationships between contracts via blockchain encryption and for smart generation of a payment term based, at least in part, on the blockchain structure.

The method may include extracting a set of contract parameters from blockchain contracts in a distributed ledger and encrypting the extracted contract parameters as a metadata block associated with the corresponding contract. Contract parameters for physical contracts may be obtained via manual inputs.

The method may include determining a hierarchical relationship between a first blockchain contract and one or more related blockchain contracts and encrypting the hierarchy data as a metadata block associated with the first contract. The determination may be based at least in part on the contract parameters for each of the related contracts.

The method may include determining a subset of the related contracts each having a payment term affected by a payment term in the first contract and encrypting the affected payment term data as a metadata block associated with the first contract. The determination may be based at least in part on the contract parameters for each of the related contracts.

The method may include extracting market-based parameters from an enterprise portal.

The method may include, using a machine learning algorithm, generating a new payment term for the first contract. The auto-generated inputs for the machine learning algorithm may include contract parameters for the first contract, contract parameters for the related contracts having affected payment terms, and market parameters.

The method may include displaying the hierarchical relationship between the first contract and the related contracts and marking, with a visual indicator, the subset of the related contracts having payment terms affected by a payment term in the first contract.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
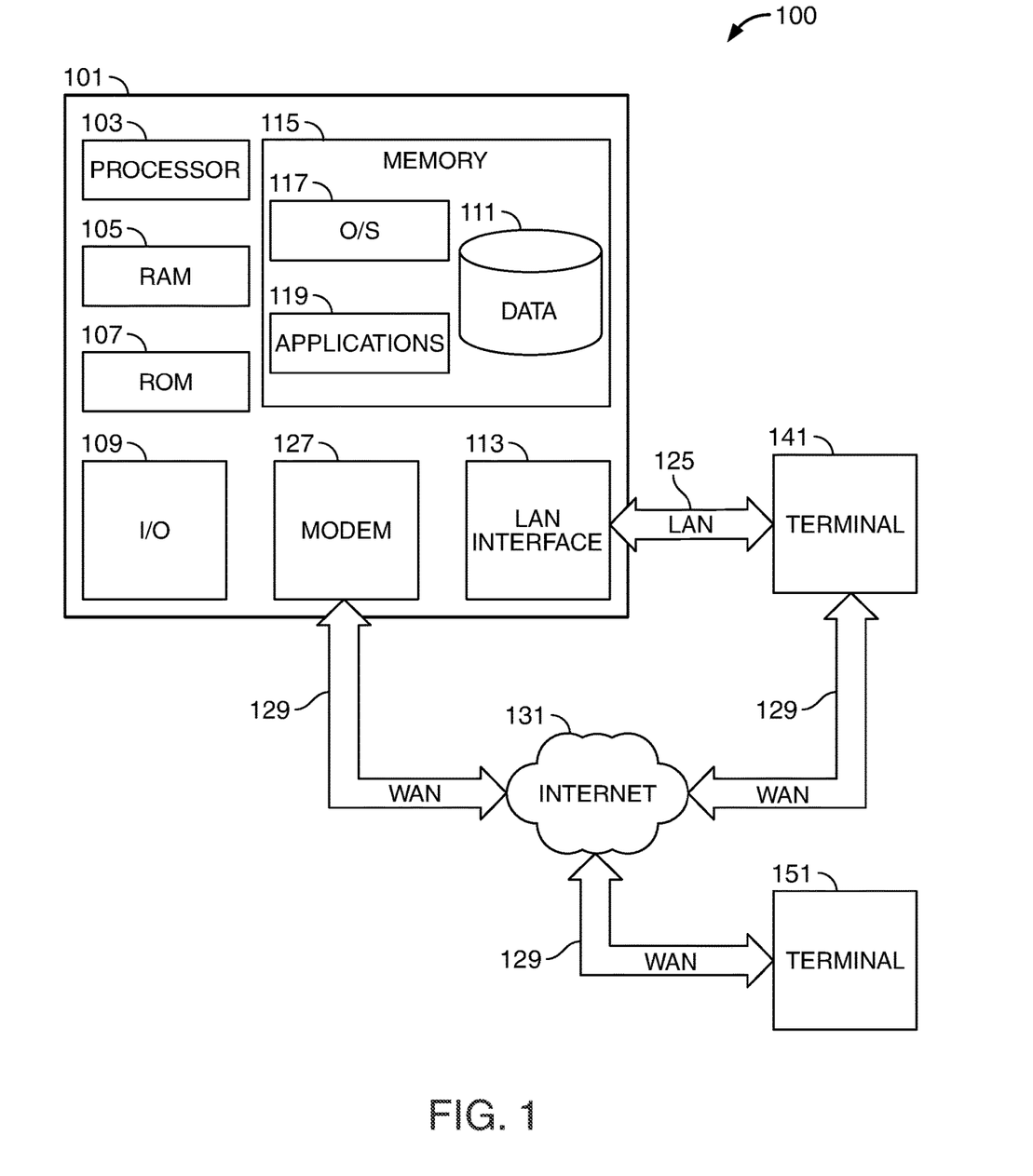
FIG. 1 shows illustrative apparatus in accordance with principles of the disclosure.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ('I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of extracting contract parameters, analyzing contract parameters, feature engineering, machine learning modeling, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
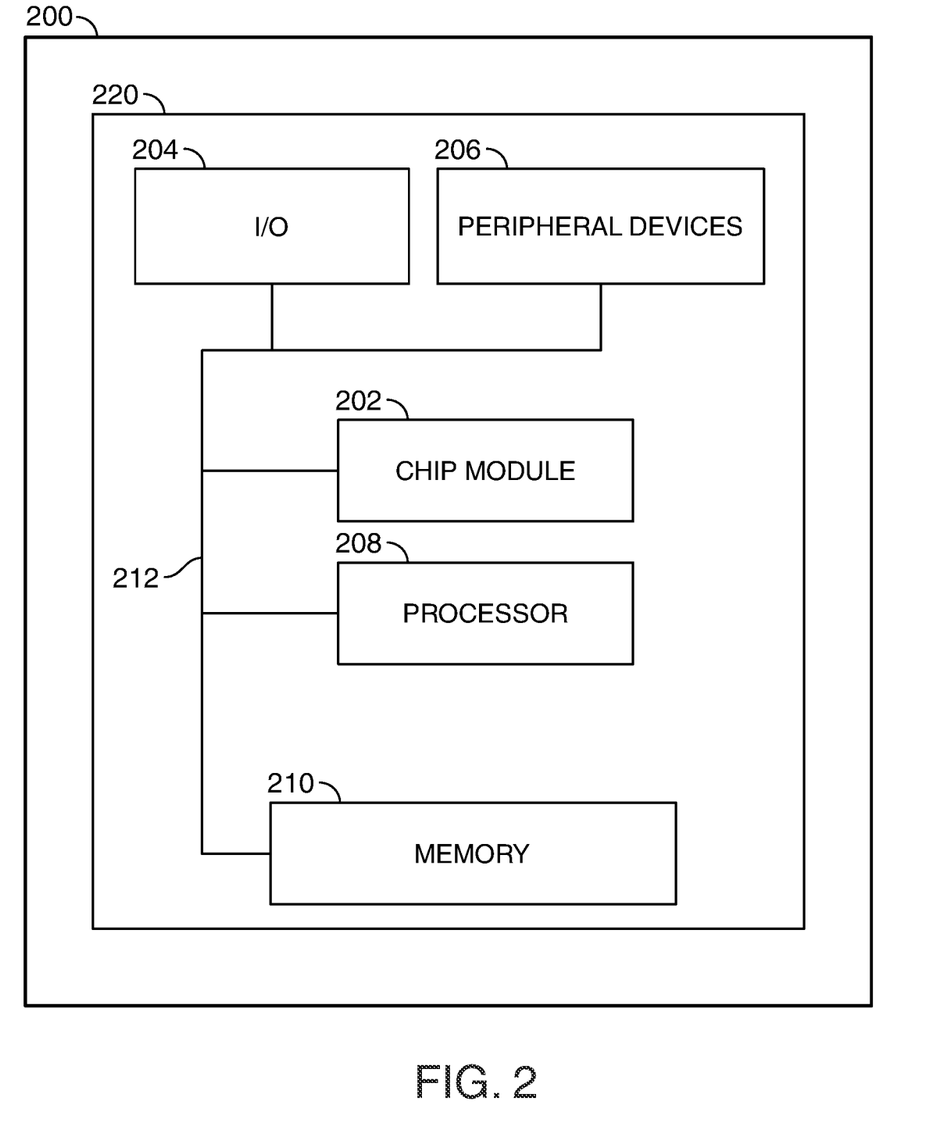
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may extract contract parameters, generate contract metadata, encrypt contract data and metadata, and perform other methods described herein; and machine-readable memory 210.

Machine-readable memory 210 may be configured to store in machine-readable data structures: contract data and metadata, extracted contract parameters, market parameters, contract payment history, generated payment terms and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
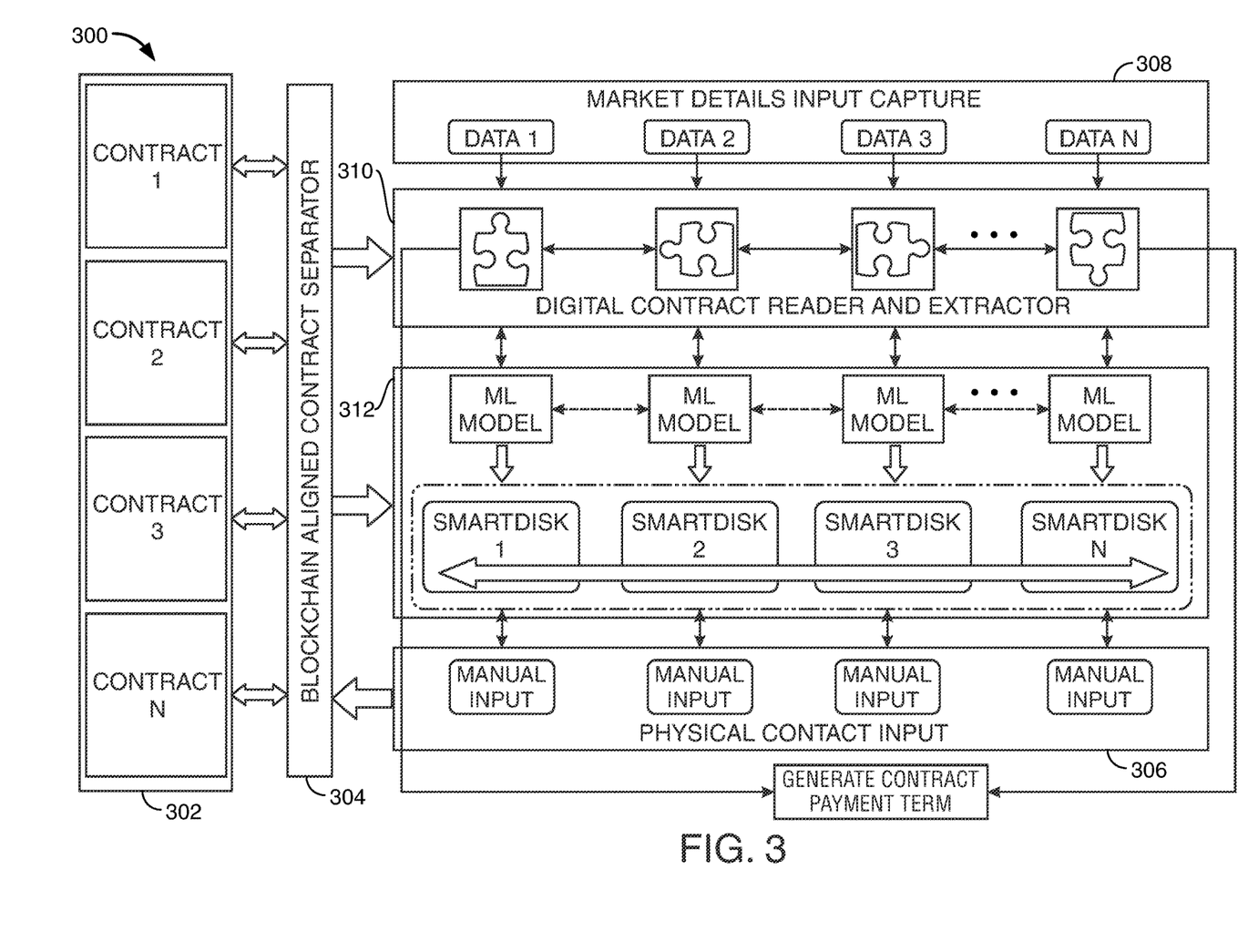
FIG. 3 shows an illustrative high-level process flow in accordance with principles of the disclosure.

FIG. 3 shows high-level system architecture 300. Contracts 302 may be digitized contracts stored in blockchain format. Blockchain aligned contract separator 304 may break out related contracts that will be affected by a contract payment. Physical contract inputs 306 may also be analyzed by the contract separator and used to identify related contracts.

Digital contract reader and extractor 310 may provide extracted contract parameter inputs for a contract as well as extracted contract parameter inputs from related blockchain contracts. Related contracts with interdependent payment terms may be identified based on metadata generated by the contract separator.

Market parameter inputs 308 may be extracted from enterprise sources. The market parameter inputs and the contract parameter inputs may be input into machine learning algorithm 312. The machine learning model is shown in communication with a smart disk. The smart disk may store evaluation logs and contract payment history. Data from the smart disk may be used for model training and tuning.

Figure 4:
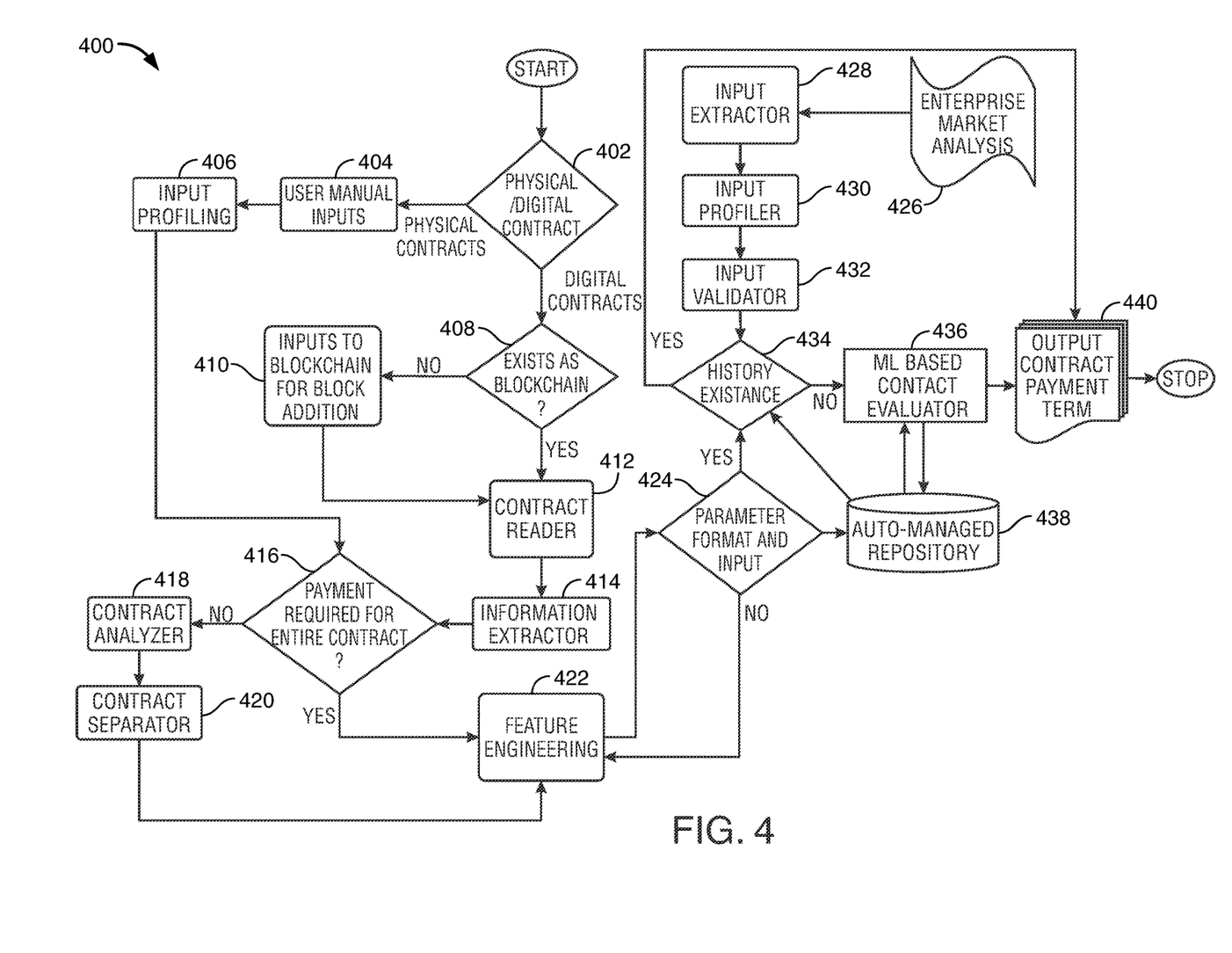
FIG. 4 shows an illustrative process flow in accordance with principles of the disclosure.

FIG. 4 shows illustrative process flow 400. Aspects of process flow 400 may be shown in architecture 300. At step 402 physical and digital contracts enter the system.

Steps 402 to 424 show the auto-generation of blockchain-based input parameters. Steps 404-406 apply to physical contracts. At step 404, a user may enter manual inputs related to the parameters of a physical contract. At step 406, input profiling may ensure that the inputs are standardized to correlate with the contract parameters extracted from blockchain contracts. The physical contract may be digitized, and the contract parameters may be encrypted as a metadata block associated with the contract (not shown).

Steps 408-414 apply to digital contracts. At step 408, the system determines if the digital contract exists in blockchain format. If the contract does not exist as blockchain, at step 410, the contract is encrypted in blockchain format. The process continues with step 412. At step 412, a contract reader scans the blockchain contract. At step 414, the information extractor filters out the desired contract parameters. The contract parameters may be encrypted as a metadata block associated with the contract.

At step 416, the system analyzes the contract parameters obtained from manual inputs or from the blockchain to determine whether payment is required for the entire contract or whether subcontracts, statements of work or partial payments are involved. If multiple payment options are possible, the process continues at step 418, otherwise the process continues at step 422.

At step 418, the contract analyzer analyzes the contract parameters and determines hierarchical relationships between contracts. The hierarchical relationships may be encrypted as a metadata block associated with a contract. At step 420, a contract separator breaks out the related contracts having dependent payment terms. The existence of these dependent payment terms may be encrypted as a metadata block associated with a contract. The contract analyzer and contract separator may be Python-based utilities.

At step 422, feature engineering may be performed on the contract parameters to generate features from the raw data for input into a machine learning algorithm. At step 424, the parameter format is standardized. If the parameter format is not compatible with the machine learning based processing, the process iterates back through step 422.

Steps 426 to 432 show the auto-generation of market-based parameters. Step 426 shows enterprise market analytics. The analytics may include a feed from an internal enterprise portal. At step 428, an input extractor extracts market parameters that may affect a contract payment from the enterprise feed. At step 430, an input profiler standardizes the contract parameters. At step 432, an input validator performs quality checks on the data. The input validator may use any suitable data quality metric.

Steps 434-440 show AI-based payment term generation. At step 434, the blockchain-based inputs and the market-based inputs are processed by the machine learning model to determine whether an identical set of data has been previously analyzed. An auto-managed repository may store evaluation logs showing past inputs and past outputs by the machine learning algorithm. If an identical scenario has already been logged, the system may bypass the machine learning algorithm and output a contract payment term at step 440.

If no identical scenario has been logged, at step 436, the contract parameters and the market parameters may be input into the machine learning algorithm. The machine learning algorithm may generate a new contract payment term based on the related contracts and the market parameters. At step 440, the system may output the new contract payment term. The new contract payment term may be optimized for lowest cost.

At step 438, the machine learning algorithm may be in communication with the auto-managed repository. The auto-managed repository may store evaluation logs showing operations of the machine learning algorithm. The auto-managed repository may provide feedback to the machine learning algorithm.

Figure 5:
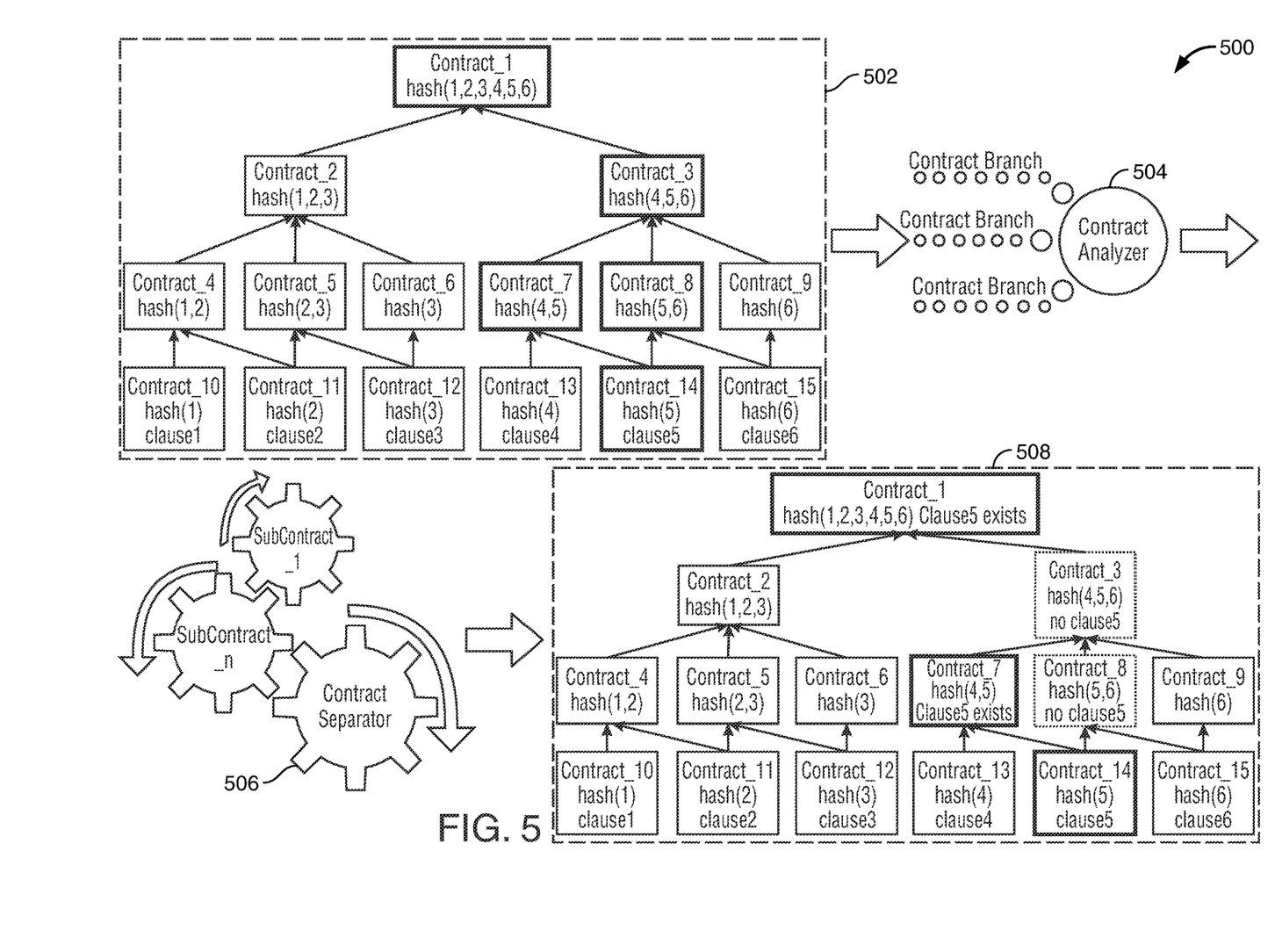
FIG. 5 shows an illustrative process flow in accordance with principles of the disclosure.

FIG. 5 shows illustrative process flow 500. Aspects of process flow 500 may also be shown in architecture 300 and process flow 400.

Hierarchy 502 shows relationships between contracts. Starting with subcontract 14 (boxed in bold) it is apparent that contract 1, subcontracts 3, 7 and 8 (also boxed in bold) are all related. Each of these blockchain contracts may include metadata that identifies the related subcontracts in the hierarchy. The metadata identifying related contracts may be hashed using the unique blockchain signature for the contract.

Contract analyzer 504 may read each of the contract branches. Contract separator 506 may determine which contracts from each branch have interdependent payment terms. Contract analyzer 504 and contract separator 506 may be Python-based utilities.

Hierarchy 508 shows relationships between contracts in the hierarchy having dependent payment terms. As determined in hierarchy 502, subcontract 14 is related to contract 1 and to subcontracts 3, 7 and 8. However, contract hierarchy 508 shows that only contract 1 and subcontract 7 will be affected by a payment to subcontract 14. The contract separator breaks out these contracts and stores the dependent payment term information as blockchain metadata.

The blockchain metadata may include extracted contract parameters for each of the contracts in the hierarchy. The blockchain metadata for contracts with interdependent payment terms may be processed as inputs for the machine learning algorithm.

Hierarchies 502 and/or 508 may be displayed to a user via a user interface. The display may use color-coding or any suitable visual indicator to mark the related contracts and the contracts having dependent payment terms within the hierarchy.

Thus, methods and apparatus for a BLOCKCHAIN-BASED DYNAMIC PAYTERM GENERATOR are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for autonomous capture of hierarchical relationships between contracts via blockchain encryption and smart generation of a contract payment term based at least in part on the blockchain structure, the system comprising:
a distributed ledger configured to store encrypted data in blockchain format, the distributed ledger storing one or more blockchain contracts;
a processor configured to:
using a first script, determine a hierarchical relationship between a first blockchain contract and one or more related blockchain contracts from the distributed ledger, and encrypt the hierarchy data as a metadata block associated with the first blockchain contract;
using a second script, determine a subset of the related contracts each having a payment term dependent on a payment term in the first contract, and encrypt the dependent payment term data as a metadata block associated with the first blockchain contract; and
using a machine learning algorithm, output an optimized payment term for the first contract, wherein inputs for the machine learning algorithm are auto-generated from the blockchain metadata;
an auto-managed repository configured to store the generated payment term and the machine learning algorithm inputs, the processor further configured to determine, before engaging the machine learning algorithm, whether an identical set of inputs and an associated generated payment term are stored in the auto-managed repository; and
a user interface configured to display the hierarchical relationship between the first contract and the related contracts and to mark, with a visual indicator, the subset of the related contracts each having a payment term dependent on a payment term in the first contract.

2. The system of claim 1 wherein the processor is further configured to, using a third script:
extract a set of contract parameters from each of a plurality of blockchain contracts in the distributed ledger; and
encrypt the extracted contract parameters for each contract as a metadata block associated with the contract;
wherein the machine learning algorithm inputs comprise the extracted contract parameters for the first contract and for a subset of the related contracts each having a payment term dependent on a payment term in the first contract.

3. The system of claim 2 wherein the extracted contract parameters comprise a payment date, a payment amount, a discount date and a discount amount.

4. The system of claim 2 wherein determination of the hierarchical relationship is based at least in part on the extracted contract parameters for the first contract and for each of the related contracts.

5. The system of claim 2 wherein the determination of the subset of related contracts each having a payment term dependent on a payment term in the first contract is based at least in part on the extracted contract parameters for the first contract and for each of the related contracts.

6. The system of claim 2 wherein:
the processor is further configured to, using a fourth script, extract a set of market-based parameters from an enterprise portal; and
the machine learning algorithm inputs further comprise the extracted market-based parameters.

7. The system of claim 2 wherein:
the processor is further configured to receive contract parameters for a physical contract via a manual input; and
the machine learning inputs comprise the received contract parameters.

8. The system of claim 6, wherein the third script for extracting contract parameters from the blockchain and the fourth script for extracting market parameters from the enterprise portal are Python scripts.

9. One or more non-transitory computer-readable media storing computer-executable instructions which, when executed by a processor on a computer system, perform a method for capturing hierarchical relationships between contracts via blockchain encryption and generating a payment term based at least in part on the blockchain structure, the method comprising:
extracting a set of contract parameters from each of a plurality of blockchain contracts in a distributed ledger and encrypting the extracted contract parameters for each contract as an associated metadata block;
determining a hierarchical relationship between a first contract and one or more related contracts from the plurality of blockchain contracts, the determination based at least in part on the extracted contract parameters for each contract, and encrypting the hierarchy data as a metadata block associated with the first contract;
determining a subset of the related contracts each having a payment term dependent on a payment term in the first contract, the determination based at least in part on the extracted contract parameters for each contract, and encrypting the dependent payment term data as a metadata block associated with the first contract;
using a machine learning algorithm, generating a new payment term for the first contract, wherein inputs for the machine learning algorithm comprise the extracted contract parameters for the first contract and for the related contracts having dependent payment terms;
storing the generated payment term and the machine learning algorithm inputs in an auto-managed repository; and
displaying the hierarchical relationship between the first contract and the related contracts and marking, with a visual indicator, the subset of the related contracts each having a payment term dependent on a payment term in the first contract.

10. The media of claim 9, wherein the contract parameter inputs for the machine learning algorithm comprise a payment date, a payment amount, a discount date, and a discount amount.

11. The media of claim 9, further comprising extracting a set of market-based parameters from an enterprise portal, wherein the machine learning algorithm inputs further comprise the extracted market-based parameters.

12. The media of claim 9, further comprising storing data associated with a first contract payment in the auto-managed repository and flagging each related contract having a dependent payment term with the first contract payment data.

13. The media of claim 9, further comprising determining, before engaging the machine learning algorithm, whether an identical set of inputs and an associated generated payment term are stored in the auto-managed repository.

14. The media of claim 9, further comprising receiving contract parameters for one or more physical contracts via manual input.

15. The media of claim 11, wherein scripts for extracting contract parameters from the blockchain and extracting market-based parameters from the enterprise portal are Python scripts.

16. A method for capturing hierarchical relationships between contracts via blockchain encryption and generating a payment term based at least in part on the blockchain structure, the method comprising:
extracting a set of contract parameters from each of a plurality of blockchain contracts in a distributed ledger and encrypting the extracted contract parameters for each contract as an associated metadata block;
determining a hierarchical relationship between a first contract and one or more related contracts from the plurality of blockchain contracts, the determination based at least in part on the extracted contract parameters for each contract, and encrypting the hierarchy data as a metadata block associated with the first contract;
determining a subset of the related contracts each having a payment term dependent on a payment term in the first contract, the determination based at least in part on the extracted contract parameters for each contract, and encrypting the dependent payment term data as a metadata block associated with the first contract;
using a machine learning algorithm, generating a new payment term for the first contract, wherein inputs for machine learning algorithm comprise the extracted contract parameters for the first contract and for the related contracts having dependent payment terms;
storing the generated payment term and the machine learning algorithm inputs in an auto-managed repository; and displaying the hierarchical relationship between the first contract and the related contracts and marking, with a visual indicator, the subset of the related contracts each having a payment term dependent on a payment term in the first contract.

17. The method of claim 16, further comprising receiving contract parameters for one or more physical contracts via manual inputs.

18. The method of claim 17, wherein the contract parameter inputs into the machine learning algorithm comprise a payment date, a payment amount, a discount date, and a discount amount.

19. The method of claim 16, further comprising extracting a set of market-based parameters from an enterprise portal, wherein the machine learning algorithm inputs further comprise the extracted market-based parameters.

20. The method of claim 17, further comprising determining, before engaging the machine learning algorithm, whether an identical set of inputs and an associated generated payment term are stored in the auto-managed repository.

21. The method of claim 19, further comprising performing one or more preprocessing operations on the contract parameters and the market parameters prior to inputting the parameters into the machine learning algorithm.

\* \* \* \* \*